United States Patent
Peng et al.

(10) Patent No.: US 7,099,626 B2
(45) Date of Patent: Aug. 29, 2006

(54) METHOD AND APPARATUS FOR GAIN EQUALIZATION BASED ON WIDE-BAND MULTI-CARRIER BASE STATION

(75) Inventors: Qingquan Peng, Shen Zhen (CN); Yijun Gui, Shen Zhen (CN)

(73) Assignee: Huawei Technologies Co., Ltd., Shen-Zhen (CN)

(*) Notice: Subject to any disclaimer, the term of this patent is extended or adjusted under 35 U.S.C. 154(b) by 443 days.

(21) Appl. No.: 10/424,960

(22) Filed: Apr. 28, 2003

(65) Prior Publication Data

US 2003/0228845 A1 Dec. 11, 2003

Related U.S. Application Data

(63) Continuation of application No. PCT/CN01/00816, filed on May 21, 2001.

(30) Foreign Application Priority Data

Nov. 14, 2000 (CN) ................................. 00 1 27433

(51) Int. Cl.
*H04B 17/00* (2006.01)

(52) U.S. Cl. .................. 455/67.11; 455/63.1; 455/423; 455/67.13; 455/45; 375/296; 375/297

(58) Field of Classification Search ................ 455/423, 455/45, 62, 63.1, 67.11, 67.13; 375/296, 375/297
See application file for complete search history.

(56) References Cited

U.S. PATENT DOCUMENTS

| | | | | |
|---|---|---|---|---|
| 5,751,705 A | * | 5/1998 | Sato | 370/335 |
| 5,761,190 A | * | 6/1998 | Yamauchi et al. | 370/210 |
| 5,854,813 A | * | 12/1998 | Rottinghaus et al. | 375/308 |
| 6,167,242 A | * | 12/2000 | Henderson et al. | 455/126 |
| 6,298,241 B1 | | 10/2001 | Hong | |
| 6,429,736 B1 | * | 8/2002 | Parry et al. | 330/2 |
| 6,587,452 B1 | * | 7/2003 | Davidovici et al. | 370/342 |
| 6,693,970 B1 | * | 2/2004 | Vankka | 375/261 |
| 6,768,902 B1 | * | 7/2004 | Kajita | 455/313 |
| 6,885,709 B1 | * | 4/2005 | Dartois | 375/297 |
| 2001/0014592 A1 | * | 8/2001 | Helms | 455/91 |

FOREIGN PATENT DOCUMENTS

| | | |
|---|---|---|
| EP | 0933888 | 8/1999 |
| GB | 2298750 | 9/1996 |

* cited by examiner

*Primary Examiner*—Duc Nguyen
*Assistant Examiner*—Justin Lee
(74) *Attorney, Agent, or Firm*—Dorsey & Whitney, LLP

(57) ABSTRACT

A method and apparatus of gain equalization based on a wide-band multi-carrier base station calculates or tests non-uniformity of a gain of an analog intermediate frequency and a radio frequency in advance and stores corresponding correction values in tables. In an initialization period before operating, the corresponding correction values are looked up from the tables based on the analog intermediate frequency and the radio frequency corresponding to each of the carriers to implement a specific correction in a multiplier of a digital up-converter before interpolation. Under a premise that hardware is not modified and specification is not degraded, the non-uniformity of the amplitude-frequency characteristic of the respective carriers in shared channels of a transmitter is equilibrated or corrected by changing a gain-adjust-coefficient of the respective carriers, thereby significantly improving the consistency of the gain of the respective carriers and reducing consumption of resources.

13 Claims, 1 Drawing Sheet

METHOD AND APPARATUS FOR GAIN EQUALIZATION BASED ON WIDE-BAND MULTI-CARRIER BASE STATION

CROSS-REFERENCE TO RELATED APPLICATION

This utility patent application is a continuation application and claims priority of the PCT International Patent Application, serial number PCT/CN01/00816, filed on May 21, 2001, which claims the priority of the Chinese patent application, serial number CN 00127433.3, filed on Nov. 14, 2000; subject matter of which are incorporated herewith by reference.

FIELD OF THE INVENTION

The invention relates to a method and apparatus for gain equalization in a wide-band multi-carrier base station.

BACKGROUND OF THE INVENTION

Under the advancement of microelectronics technology and software technology, both wireless (e.g. cellular) communication networks and wire communication networks have been developing towards digitalization, personalization, wide-band, intelligent and multi-media. The wide-band digitalization has become the foundation in a base station system of a cellular communication network. Digital devices of an intermediate frequency portion, even a radio frequency portion, have been used to substitute analog devices. A concept of wide-band multi-carrier base station has appeared. Comparing with a narrow-band base station, a wide-band multi-carrier base station has outstanding features of generality and flexibility. For example, different band width, different system and different application required by users can be satisfied by changing software settings of a digital portion.

A gain of respective carriers of shared portions in a transmitting channel of a wide-band multi-carrier base station has a certain inconsistency. Common portions of the respective carriers of a transmitting channel of the wide-band multi-carrier base station comprise a wide-band high rate digital to analog converter (DAC), a wide-band transmitter, a wide-band linear amplifier, and an antenna feeder. The antenna feeder typically has ideal amplitude-frequency characteristics within a very wide frequency band. Therefore, the difference of the respective carriers caused by the antenna feeder is normally not considered. An output of the DAC has an amplitude-frequency characteristic according to a scrolling down Sinc function, and an output signal amplitude response at Fs/2 (Fs is clock frequency) is 3.92 dB lower than that of at 0 frequency. This is an extreme condition that is actually not used. However, if the bandwidth of a wide-band multi-carrier is larger than Fs/10, the gain difference between the respective carriers caused by the DAC will reach 0.5 dB, even 1 dB. The gain difference between the respective carriers in an operation frequency band of the wide-band transmitter and wide-band linear power amplifier can also reach 1 dB, even 2 dB. In this way, after a plurality of digital intermediate frequency signals with the same amplitude passing through the wide-band transmitter, the final output power difference of the respective carriers is possible to reach 0.5 dB, even above 2 dB.

When designing a system, it is required that each of the carriers exceed a design nominal value. For a wide-band multi-carrier system, it is required that the maximum power outputted by a carrier with the lowest gain reach the nominal value. In this way, the maximum transmitting power of the other carriers in the system can exceed the nominal value or even can reach a value above 2 dB. Thus, a larger power tolerance is reserved for the common portions of the respective carriers of a transmitting channel, particularly the power amplifier. Accordingly, this causes the difficulty of designing a system and the increasing of the cost.

SUMMARY OF THE INVENTION

One of the objectives of the present invention is to provide a method and apparatus for gain equalization based on a wide-band multi-carrier base station to solve the above problem that an amplitude-frequency characteristic of a transmitting channel of a multi-carrier base station is not plain or uniform. The method and apparatus of the present invention can be used properly in a respective wide-band multi-carrier base station to adjust the gain of the respective carriers in a transmitting channel to a nominal value.

In one embodiment of the present invention, a method and apparatus for gain equalization based on a wide-band multi-carrier base station is characterized in that non-uniformity of gains of analog intermediate frequency and radio frequency are calculated or tested in advance and stored into two query tables; and in an initialization period before operating, the corresponding correction values are looked up from the two query tables based on the intermediate frequency and the radio frequency corresponding to each of the carriers to implement a correction. The method comprises the steps of:

a) calculating the gain of the respective carriers at an output port of a digital to analog converter (DAC), and normalizing to obtain a first gain correction factor in a first gain correction factor table;

b) testing the gain of the respective carriers in a radio frequency channel, and normalizing to obtain a second gain correction factor in a second gain correction factor table;

c) storing the first and second gain correction factor tables; and d) looking up the first and second gain correction factors from the first and second gain correction factor tables based on the intermediate frequency and radio frequency corresponding to each of the carriers, and multiplying the first gain correction factor with the second gain correction factor to obtain a gain-adjust-coefficient of the carrier.

In the above method of the present invention, the step a) of obtaining the first gain correction factor comprises the steps of: within an intermediate frequency bandwidth of f1~f2, calculating amplitude values of an ideal interpolating function (Sin x/X) corresponding to frequency points of respective possible carriers according to a minimum channel space being a step $\Delta$; using f1 as a reference to normalize the amplitude values of the respective frequency points; and taking reciprocal values to obtain the first gain correction factor of intermediate frequency points.

In the above method of the present invention, the intermediate frequency f1 is integral multiples of the minimum channel space step $\Delta$.

In the above method of the present invention, frequency of the frequency points of the respective possible carriers is f1+m$\Delta$, wherein there are totally (f2−f1)/$\Delta$+1 points, and m is an integral number.

In the above method of the present invention, the step b) of obtaining the second gain correction factor comprises the steps of: outputting one carrier with a proper level by the DAC to a radio frequency portion through setting; changing a local oscillator frequency to vary a final output signal arbitrarily with the step Δ within a required frequency bandwidth of f3~f4; and testing corresponding gain values to find a maximum value therein; and using the maximum value as a reference to normalize gain values of the respective frequency points and taking reciprocal values to obtain the second gain correction factor of the respective frequency points of the radio frequency portion.

In the above method, frequency of respective possible carrier frequency points is f3+mΔ, wherein there are totally (f4−f3)/Δ+1 points, and m is an integral number.

In the above method, intermediate frequency points of the respective carriers are controlled by a numerical control oscillator (NCO) in an digital up-converter (DUC), a frequency setting of a radio frequency oscillator is completed in a digital intermediate frequency portion.

In the above method, the first and second gain correction factor tables can be obtained from detecting a voltage or power at an output port of a power amplifier.

The present invention also provides an apparatus for gain equalization based on a wide-band multi-carrier base station having n base-band processing portions, n digital up-converters (DUCs), a multiple synthesizing summer, a digital to analog converter (DAC), a wide-band transmitter, a wide-band power amplifier, and an output antenna, wherein outputs of the n base-band processing portions are connected to the n digital up-converters, respectively, the outputs of n digital up-converters are connected to the multiple synthesizing summer, and the multiple synthesizing summer, the DAC, the wide-band transmitter, the wide-band power amplifier and the output antenna are connected sequentially.

In the above device, each of the DUCs comprises: a modulator; a gain adjustment digital multiplier; an interpolation filter; a high rate digital multiplier; and a numerical control oscillator (NCO). The output of the respective base-band processing portion is connected to the modulator, and the modulator, the gain adjustment digital multiplier, the interpolation filter, and the high rate digital multiplier are connected sequentially. First and second gain correction factors are input into the gain adjustment digital multiplier, and an output of the NCO is input into the high rate digital multiplier.

In the above device, the gain adjustment digital multiplier is composed of at least one low rate digital multiplier.

In the above device, the first and second gain correction factors of respective carriers are obtained by looking up a DAC gain correction factor table and a radio frequency gain correction factor table.

In the above device, the radio frequency gain correction factor table can be obtained from detecting a voltage or power at an output port of the wide-band power amplifier.

One of the advantages of the present invention is that the non-uniformity of the amplitude-frequency characteristic of the respective carriers in shared channels of a transmitter can be equilibrated or corrected by changing a gain-adjust-coefficient of the respective carriers in a digital intermediate frequency portion, while the hardware does not need to be modified, and the specification is not degraded. Accordingly, the gain differences of the respective carrier channels are very small, thereby reducing the cost of, particularly the cost related to power amplification. Further, since the gain differences of the respective carriers in a shared portion of the transmission channels are calculated and tested, and the gain differences are corrected or equilibrated by a gain-adjust-coefficient in digital up-converters of the respective carriers, the uniformity of the gains of the respective carriers in the shared portion of the transmission channels are improved significantly, power tolerance of a transmitter system is decreased, and the system design is simplified. Furthermore, since a digital multiplier is used, a gain adjustment can be implemented at a low data rate portion to reduce consumption of resources.

BRIEF DESCRIPTION OF THE DRAWINGS

The specific features and performances of the present invention are provided by the following embodiments and the drawings thereof.

DETAILED DESCRIPTION OF THE PREFERRED EMBODIMENTS

Due to the restriction by the performance of semiconductor chips, the bandwidth of an intermediate frequency in a wide-band multi-carrier system is not able to reach to the bandwidth of a radio frequency. Thus, the frequency of a final output signal of a wide-band transmitter generally requires to be determined by the intermediate frequency and local oscillator frequency.

In one embodiment of the present invention, the gain differences of the respective carrier in a shared portion of transmission channels are calculated and tested, and the gain differences are corrected or equilibrated by a gain-adjust-coefficient of digital up-converters of the respective carriers.

Figure 1:
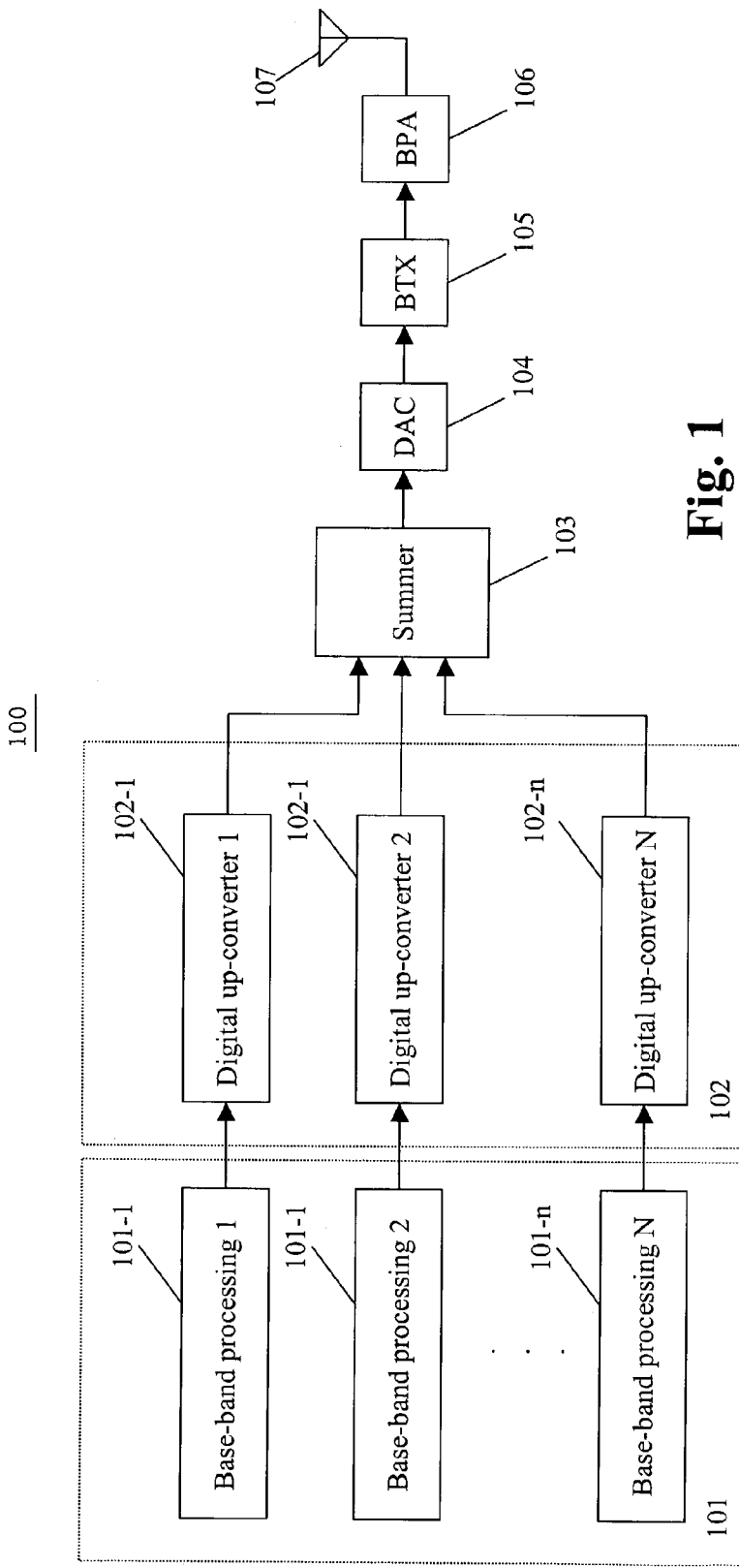
FIG. 1 is a block diagram of one embodiment of a transmitter system of a wide-band multi-carrier base station in accordance with the principles of the present invention.

FIG. 1 is a block diagram of one embodiment of a wide-band transmitter 100 of a wide-band multi-carrier base station in accordance with the principles of the present invention. In this embodiment, the wide-band transmitter supports N carriers. The wide-band transmitter 100 comprises n base-band processing portions 101-1~101-n, n digital up-converters (DUCs) 102-1~102-n, a multiple synthesizing summer 103, a digital to analog converter (DAC) 104, a wide-band transmitter (BTX) 105, a wide-band power amplifier (BPA) 106, and a digital output antenna 107. The outputs of the n base-band processing portions 101 are connected to the n DUCs 102, respectively. The outputs of n DUCs 102 are connected to the multiple synthesizing summer 103, and the multiple synthesizing summer 103, the DAC 104, the BTX 105, the BPA 106, and the digital output antenna 107 are connected sequentially. The base-band processing portions 101 perform the function of encoding and interleaving, wherein 101-1~101-n represent respectively the base-band processing portions of n carriers with the same structure, and the data are outputted from the base-band processing portions 101 to the DUCs 102 via buses. The serial to parallel conversion of the data, the modulation, the interpolation, the filtering, the digital up-conversion, and the other functions, such as the power control and the gain adjustment, and the like, are implemented by the DUCs 102. 102-1~102-n represent N digital up-converters with the same structure, respectively, and they constitute N carrier frequencies, together with the base-band processing portions 101-1~101-n, which are independent to each other. The summing of n outputs of N digital up-converters 102 are implemented by the summer 103 to complete the synthesis of the multi-carriers in a digital domain. The synthesized signals are non-constant envelope signals, and the transition from a narrow-band to a wide-band is implemented herein. The conversion from digital to analog is implemented by the DAC 104. The transmitter system 100 supports wide-band multi-carrier operations. The operations, such as filtering, shifting spectrum, and amplifying the respective carriers to a desired level, and the like, are implemented by the BTX 105, the power amplifying of the multi-carrier signals is implemented by the BPA 106, and the amplified output signals are transmitted via the digital output antenna 107. The wide-band multi-carrier signals are supported to operate simultaneously from the summer 103 to the digital output antenna 107 to reduce the interference among the respective carriers. The linearity of the wide-band base station system is generally reflected by the DAC 104, the BTX 105 and the BPA 106. In the present invention, the portion between the summer 103 and the digital output antenna 107 has very high linearity and stability.

Figure 2:
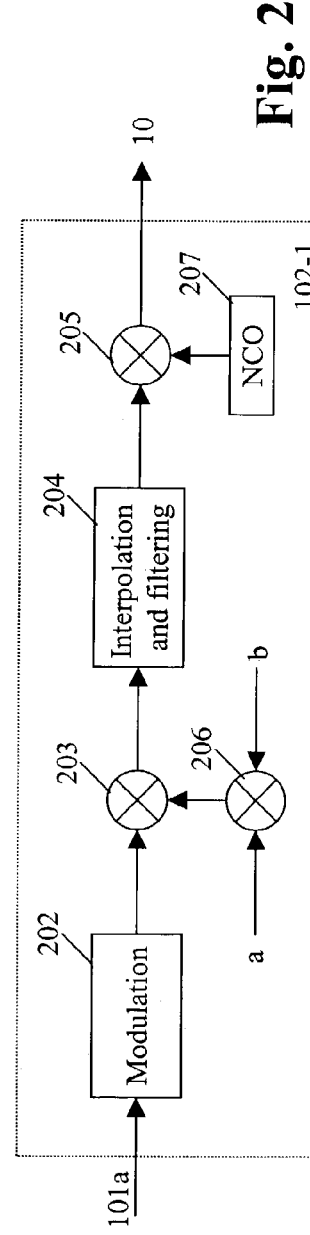
FIG. 2 is a block diagram of one embodiment of a digital up-converter (DUC) of the transmitter system of the wide-band multi-carrier base station in accordance with the principles of the present invention.

As shown in FIG. 2, the DUC 102 of the present invention comprises a modulator 202, a gain adjustment digital multiplier 203, an interpolation filter 204, a high rate digital multiplier 205, and a numerical control oscillator 207. The outputs of the base-band processing portions 101 of n carrier frequency with the same structure correspond to n DUCs, respectively, and are connected, respectively. The output of the base-band processing portion 101 of each carrier frequency corresponds to one of the DUCs and is connected with the modulator 202. The modulator 202, the gain adjustment digital multiplier 203, the interpolation filter 204, and the high rate digital multiplier 205 are connected sequentially. Gain correction factors, a and b, are inputted into the gain adjustment digital multiplier 203. The output of a numerical control oscillator (NCO) 207 is inputted into the high rate digital multiplier 205. The gain adjustment digital multiplier 203 is composed of one, two or more low rate digital multipliers in series, 203, 206, etc.

Accordingly, in FIGS. 1 and 2, the output of the base-band processing portion 101-1 is sent to the modulator 202 of the DUC 102-1, and the modulator 202, the gain adjustment digital multipliers 203 and 206, the interpolation filter 204, and the high rate digital multiplier 205 are connected sequentially. The gain correction factors, a and b, are sent to the gain adjustment digital multiplier 203, 206, and the output of the numerical control oscillator 207 is sent to the high rate digital multiplier 205. The output of the high rate digital multiplier 205 is sent to the summer 103.

The conversion of the serial data to the parallel data is implemented by the base-band processing portions 101. A plurality of modulation methods are implemented by the modulator 202 based on user's requirement. The data rate is increased, and the frequency components introduced by the interpolation are filtered by the interpolation filter 204. The frequency shifting is implemented by the high rate digital multiplier 205 and the NCO 207. The base-band data are shifted to the intermediate frequency by using the method of digital mixing, and the local oscillator signal used by the digital mixing is provided by the NCO 207. The gain adjustment digital multipliers 203 and 206 are used for adjusting a signal amplitude of a carrier output, and the gain correction factors of the DAC and the radio frequency channels are represented by the coefficients a and b, respectively. In order to decrease the resources occupied by the two digital multipliers 203, 206, the digital multipliers 203, 206 are implemented in a low rate portion before interpolating.

The low rate multipliers 203, 206 are used in the present invention for multiplying the gain correction factors a and b, by looking up gain correction factor tables of DAC and the radio frequency portions, to ensure that the gain of the respective carriers is the same, wherein a and b are the gain-adjust-coefficients of the respective carriers. For a given wide-band system, different frequency points have different a values, however, the b values of different frequency points may be different, the gain-adjust-coefficient a and b of the respective carriers cannot be the same. Therefore, the gain correction factors of the respective carriers are obtained by looking up the tables. The present invention makes the output power of the respective carriers of the wide-band multi-carrier base station to have hardly any difference at the same power level, thereby significantly decreasing the power tolerance required by the system design, simplifying the system design, and reducing the cost of the transmitter system, particularly the cost of the BPA 106.

The method for calculating and obtaining the gain correction factors of the respective carriers in the present invention is to calculate and obtain, to store and to look up two tables, a DAC gain correction factor table and a radio frequency gain correction factor table. These two tables are obtained by using the voltage and power tested at an output port of the power amplifier.

The intermediate frequency points of the respective carriers of the wide-band system related to in the present invention is controlled by the NCO in the DUC, and the setting of the local oscillator frequency is also performed in the digital intermediate frequency portion. When the system is operated, the outputs of the NCO of the respective carriers and the output frequency of the local oscillator frequency are obtained by the digital processing portion firstly based on the frequency and bandwidth expected to be outputted by the transmitter and certain calculations. Also, the gain coefficients of the respective carriers in the DAC and the radio frequency portion are obtained by looking up the tables based on these information. Then, the gain-adjust-coefficient of the respective carriers are calculated according to certain algorithm. Finally, the gain-adjust-coefficient, the NCO, and the local oscillator frequency information are configured into the carriers.

The above method comprises the steps of:

a) calculating the gain correction factors of the respective carriers at an output port of a DAC, which comprises the steps of: in an intermediate frequency bandwidth f1~f2 of a system design, using a minimum channel space as a step $\Delta$ (wherein f1 is integral multiples of $\Delta$, for GSM, $\Delta$=200 KHz); calculating amplitude values of a deal interpolating function (Sin x/X) corresponding to respective possible carrier frequency points (frequency is f1+m$\Delta$, m is integral number, and there are totally (f2−f1)/$\Delta$+1 points); using f1 as a reference to normalize the amplitude values of the respective possible frequency points; and taking reciprocal values to obtain a DAC gain correction factor table of intermediate frequency points.

b) testing the gain correction factors of the respective carriers in a radio frequency channel, which comprises the steps of: outputting one of the carriers with a proper level by the DAC to a radio frequency portion through setting; changing frequency of a local oscillator so that final output signals are allowed to be changed arbitrarily in a frequency bandwidth f3~f4 with a step $\Delta$; testing gain values corresponding to frequency points of the respective possible carriers (frequency is f3+m$\Delta$, m is an integral number, there are totally (f4−f3)/$\Delta$+1 points); looking for a maximum value among the respective possible carriers; using the maximum value as a reference to normalize the gain values of the respective frequency points; and performing a reciprocal calculation to obtain a radio frequency gain correction factor table of radio frequency points of the radio frequency portion.

c) storing the DAC gain correction factor table and the radio frequency gain correction factor table; and d) determining NCO frequency of the respective carriers by a digital processing portion based on the frequency and bandwidth of the respective carriers expected to be outputted by a transmitter; obtaining the gain correction factors of the respective carriers in the DAC and the radio frequency portion by looking up the tables; multiplying the gain correction factors; and using multiplied result as a gain-adjust-coefficient of the respective carriers.

The above process in accordance with the principles of the present invention significantly improves the consistency of the gains of the respective carriers in a shared portion of a transmission channel, decreases the power tolerance of the system design, simplifies the system design, and reduces the cost of hardware.

INDUSTRY APPLICABILITY

The present invention can be applied to various wide-band multi-carrier base stations to allow the gains of the respective carriers to have an excellent consistency.

What is claimed is:

1. A method of gain equalization based on a wide-band multi-carrier base station, comprising the steps of:
   a) calculating a gain of respective carriers at an output port of a digital to analog converter (DAC) and normalizing to obtain a first gain correction factor table with a plurality of respective first gain correction factors;
   b) testing the gain of the respective carriers in a radio frequency portion and normalizing to obtain a second gain correction factor table with a plurality of respective second gain correction factors, wherein the step of obtaining the second gain correction factors comprises the steps of: outputting one of the carriers with a proper level by the DAC to the radio frequency portion through setting; changing a local oscillator frequency; varying a final output signal arbitrarily with a step $\Delta$ within a frequency bandwidth f3–f4; testing corresponding gain values to find a maximum value; using the maximum value as a reference to normalize the gain values of frequency points of the respective carriers; and taking reciprocal values to obtain the second gain correction factors of the frequency points of the radio frequency portion;
   c) storing the first and second gain correction factor tables; and
   d) looking up a first gain correction factor from the first gain correction factor table and a second gain correction factor from the second gain correction factor table corresponding to each of the carriers, and multiplying the first gain correction factor with the second gain correction factor, and using multiplied result as a gain-adjust-coefficient of the respective carrier.

2. The method of claim 1, wherein the step of obtaining the first gain correction factors comprises the steps of: within an intermediate frequency bandwidth of f1~f2, calculating amplitude values of interpolating function (Sin x/X) corresponding to frequency points of the respective carriers according to a minimum channel space of a step $\Delta$, using an intermediate frequency f1 as a reference to normalize the amplitude values of the frequency points of the respective carriers, and taking reciprocal values to obtain the first gain correction factors of intermediate frequency points.

3. The method of claim 2, wherein the intermediate frequency f1 is integral multiples of a minimum channel space step $\Delta$.

4. The method of claim 2, wherein frequency of the frequency points of the respective carriers is f1+m$\Delta$, and there are totally (f2−f1)/$\Delta$+1 points, m is an integral number.

5. The method of claim 1, wherein frequency of the frequency points of the respective carriers is f3+m$\Delta$, and there are totally (f4−f3)/$\Delta$+1 points, m is an integral number.

6. The method of claim 2, wherein the intermediate frequency points of the respective carriers are controlled by a numerical control oscillator (NCO) in a digital up-converter (DUC), and setting of frequency of a radio frequency oscillator is completed in the intermediate frequency bandwidth.

7. The method of claim 1, wherein the second gain correction factor table is obtained from a voltage detection at an output port of a power amplifier.

8. The method of claim 1, wherein the second gain correction factor table is obtained from a power detection at an output port of a power amplifier.

9. An apparatus of gain equalization based on a wide-band multi-carrier base station having a transmitter system, comprising:
   a plurality of base-band processing portions;
   a plurality of digital up-converters (DUCs);
   a multiple synthesizing summer;
   a digital to analog converter (DAC);
   a wide-band transmitter;
   a wide-band power amplifier; and
   an output antenna;
   wherein outputs of the plurality of the base-band processing portions are connected to each of the digital up-converters, respectively, outputs of the DUCs are connected to the multiple synthesizing summer, and the multiple synthesizing summer, the DAC, the wide-band transmitter, the wide-band power amplifier, and the output antenna are connected sequentially; and
   wherein each of the DUCs comprises:
   a modulator;
   a gain adjustment digital multiplier;
   an interpolation filter;
   a high rate digital multiplier; and
   a numerical control oscillator;
   wherein each of the outputs of the base-band processing portions is connected to the modulator, and the modulator, the gain adjustment digital multiplier, the interpolation filter, and the high rate digital multiplier are connected sequentially, first and second gain correction factors are sent to the gain adjustment digital multiplier, respectively, and an output of the numerical control oscillator is sent to the high rate digital multiplier.

10. The apparatus of claim 9, wherein the gain adjustment digital multiplier includes first and second low rate digital multipliers connected in series.

11. The apparatus of claim 9, wherein the first and second gain correction factors of the respective carriers are obtained by looking up a DAC gain correction factor table and a radio frequency gain correction factor table.

12. The apparatus of claim 11, wherein the radio frequency gain correction factor table is obtained from a voltage detection at an output port of the wide-band power amplifier.

13. The apparatus of claim 11, wherein the radio frequency gain correction factor table is obtained from a power detection at an output port of the wide-band power amplifier.

* * * * *